(12) United States Patent
Rodriguez et al.

(10) Patent No.: US 9,159,246 B2
(45) Date of Patent: Oct. 13, 2015

(54) SCIENCE, TECHNOLOGY, ENGINEERING AND MATHEMATICS BASED CYBER SECURITY EDUCATION SYSTEM

(71) Applicant: Raytheon Company, Waltham, MA (US)

(72) Inventors: Ricardo J. Rodriguez, Palmetto, FL (US); William R. Schweikert, Seminole, FL (US); Yvette M. Thornton, Safety Harbor, FL (US); William Shane Powell, Seminole, FL (US); Edgardo Ramon Perez-Piris, Largo, FL (US); Joseph S. Cuenco, Gulfport, FL (US); Michael G. Mikurak, St. Petersburg, FL (US)

(73) Assignee: RAYTHEON CYBER PRODUCTS, LLC, Herndon, VA (US)

( * ) Notice: Subject to any disclaimer, the term of this patent is extended or adjusted under 35 U.S.C. 154(b) by 0 days.

(21) Appl. No.: 13/733,977

(22) Filed: Jan. 4, 2013

(65) Prior Publication Data
US 2013/0177878 A1  Jul. 11, 2013

Related U.S. Application Data

(60) Provisional application No. 61/583,763, filed on Jan. 6, 2012.

(51) Int. Cl.
G09B 19/00 (2006.01)
(52) U.S. Cl.
CPC .................................. *G09B 19/0053* (2013.01)
(58) Field of Classification Search
CPC .................................................. G09B 19/0053

USPC ......................................................... 434/118
See application file for complete search history.

(56) References Cited

U.S. PATENT DOCUMENTS 5,627,884 A  5/1997  Williams et al.
6,563,921 B1  5/2003  Williams et al.
(Continued)

FOREIGN PATENT DOCUMENTS

WO  WO2004061730  7/2004

OTHER PUBLICATIONS

Chi Thanh Vi, et al., "Detecting Error-Related Negativity for Interaction Design," CHI'12, May 5-10, 2012, Austin, Texas, pp. 493-502.
(Continued)

*Primary Examiner* — Sam Yao
*Assistant Examiner* — Thomas Hong
(74) *Attorney, Agent, or Firm* — Cantor Colburn LLP

(57) ABSTRACT

According to one aspect, a science, technology, engineering and mathematics (STEM) based cyber security education system is provided. A training component, a knowledge component, and a collaborative component are interfaced to a distance learning component to form a STEM-based cyber security education system interface on an educational content server. The educational content server is coupled to a content database configured to access STEM-based cyber security educational content associated with one or more of: the training component, the knowledge component, and the collaborative component. Asynchronous delivery of the STEM-based cyber security educational content is provided to an end user computer in response to a user request. An interactive session is established between one or more experts and the end user computer to provide synchronous delivery of STEM-based cyber security materials.

18 Claims, 6 Drawing Sheets

(56) References Cited

U.S. PATENT DOCUMENTS

| | | | |
|---|---|---|---|
| 6,754,334 | B2 | 6/2004 | Williams et al. |
| 8,601,587 | B1* | 12/2013 | Powell et al. .................. 726/25 |
| 2003/0182582 | A1* | 9/2003 | Park et al. ..................... 713/201 |
| 2009/0035733 | A1* | 2/2009 | Meitar et al. .................. 434/118 |
| 2009/0124921 | A1* | 5/2009 | Milgramm et al. ........... 600/544 |
| 2009/0144308 | A1* | 6/2009 | Huie et al. .................... 707/102 |
| 2010/0003659 | A1* | 1/2010 | Edmonds ...................... 434/350 |
| 2011/0159465 | A1 | 6/2011 | Gutridge |

OTHER PUBLICATIONS

Retrieved from the internet on Jan. 4, 2013, http://www.scientificamerican.com/article.cfm?id=the-eyes-get-it, "Eye Movements Shed Light on Our Sense of Humor," 2 pages.

Retrieved from the internet on Jan. 7, 2013, http://www.epo.org/learning-events/events/training/patent-information/request.html, "Patent Information Training," 2 pages.

Retrieved from the internet on Jan. 7, 2013, http://www.prnewswire.co.uk/news-releases/toolwire-to-deliver-virtual-hands-on-learning-for-citrix-xenserver-152658325.html, "Toolwire to Deliver Virtual Hands-On Learning for Citrix XenServer," 2 pages.

R. Rodriquez, et al., "Towards a Hierarchical Temporal Memory Based Self-managed Dynamic Trust Replication Mechanism in Cognitive Mobile Ad-Hoc Networks," in Proceedings of the 10th WSEAS International Conference on artificial intelligence, knowledge engineering and data bases, 2011, pp. 320-328.

Retrieved from the internet on Jan. 7, 2013, http://www.virtualnerd.com/news/releases/parent-tested-parent-approved.php, "Virtual Nerd Is Parent Tested, Parent Approved," 2 pages.

* cited by examiner

SCIENCE, TECHNOLOGY, ENGINEERING AND MATHEMATICS BASED CYBER SECURITY EDUCATION SYSTEM

CROSS REFERENCE TO RELATED APPLICATIONS

This application claims priority to U.S. Provisional Patent Application Ser. No. 61/583,763, filed Jan. 6, 2012, the entire contents of which are specifically incorporated by reference herein.

BACKGROUND

The present disclosure relates generally to cyber security systems and, more particularly, to a science, technology, engineering and mathematics (STEM) based cyber security education system.

Cyber security is perhaps the top national security imperative for the United States. Cyber space is assuming its place as the fifth operational domain besides air, land, sea, and space. In order to support cyber operations upon which both kinetic and non-kinetic battle spaces are dependent, a sufficient talent pool should be developed. Likewise, the future growth of commercial and civilian enterprise is also dependent upon the availability of a highly trained cyber-savvy workforce. The path to growing the needed workforce lies in STEM-based (Science, Technology, Engineering, and Mathematics) cyber security education. The key to security and well-being of a nation lies in its people, more so than firewalls or software. Although it is desirable to attain STEM educated citizens of all disciplines, it is equally if not more desirable to develop talent in the area of cyber security.

SUMMARY

According to one embodiment of the present invention, a method for establishing a science, technology, engineering and mathematics (STEM) based cyber security education system is provided. A training component, a knowledge component, and a collaborative component are interfaced to a distance learning component to form a STEM-based cyber security education system interface on an educational content server. The educational content server is coupled to a content database configured to access STEM-based cyber security educational content associated with one or more of: the training component, the knowledge component, and the collaborative component. Asynchronous delivery of the STEM-based cyber security educational content is provided to an end user computer in response to a user request. An interactive session is established between one or more experts and the end user computer to provide synchronous delivery of STEM-based cyber security materials.

According to another embodiment of the present invention, a system for STEM based cyber security education is provided. The system includes a content database configured to access STEM-based cyber security educational content. An educational content server is coupled to the content database. The educational content server includes a STEM-based cyber security education system interface that includes a training component, a knowledge component, and a collaborative component interfaced to a distance learning component. The STEM-based cyber security education system interface is configured to provide asynchronous delivery of the STEM-based cyber security educational content to an end user computer in response to a user request. The STEM-based cyber security education system interface is further configured to establish an interactive session between one or more experts and the end user computer to provide synchronous delivery of STEM-based cyber security materials.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
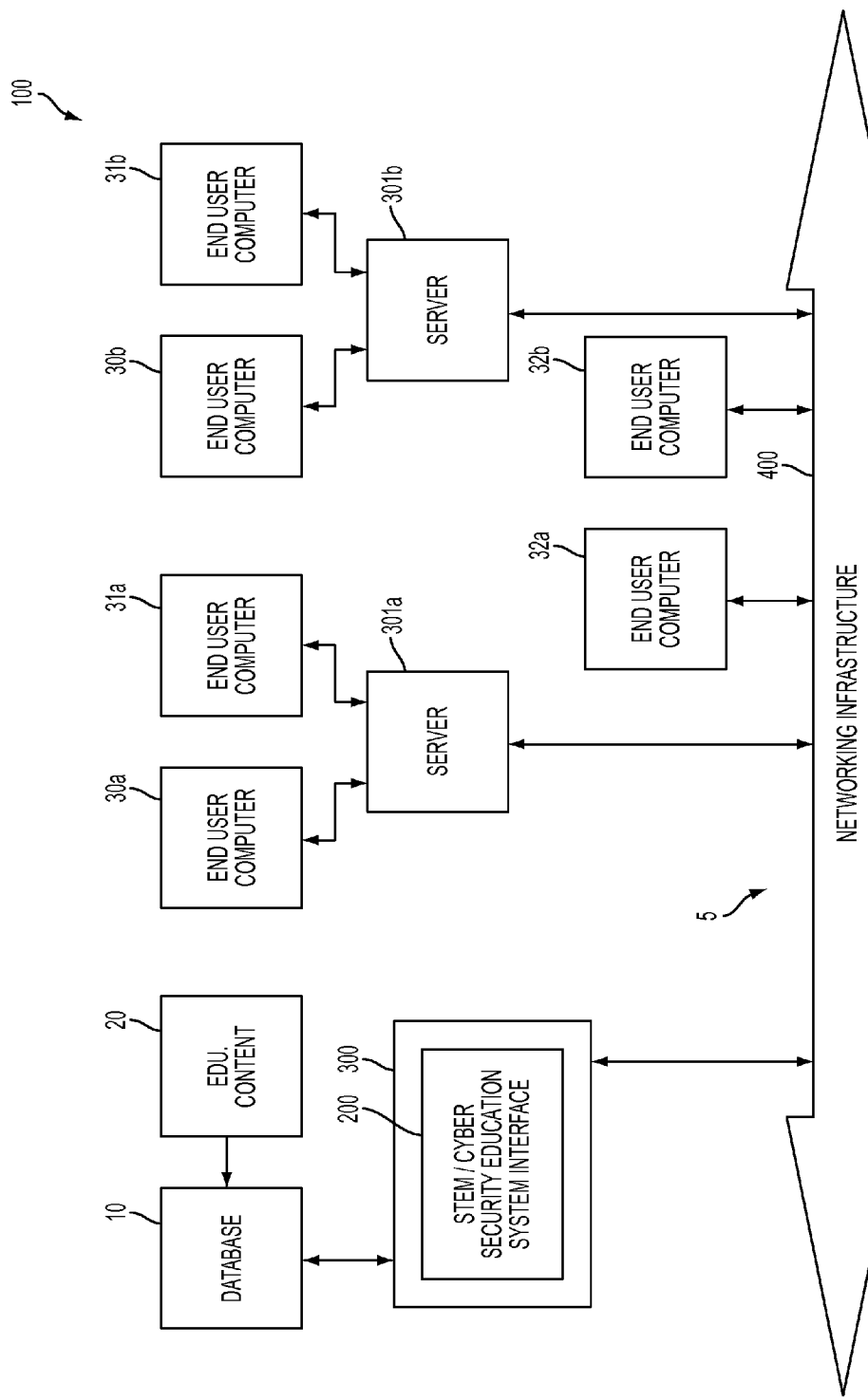
FIG. 1 is a schematic of a networking arrangement implementing a STEM-based cyber security education system according to an exemplary embodiment.

Exemplary embodiments disclosed herein provide a science, technology, engineering, and mathematics (STEM) based cyber security education system. The education system is designed to build skills and talents in STEM/cyber security defense capabilities through a hands-on virtual classroom delivery method. The education system may be tailored to middle and high school levels to provide a progression path towards employment within this field, as well as post-secondary education. Embodiments utilize a hands-on virtual classroom model to increase the students' STEM learning capabilities and retention. The education system may provide students with necessary training to successfully complete national certifications (e.g., CompTIA's A+, Net+ and Security+ certifications) and to position them to join the workforce in the field of cyber security.

Aspects of embodiments include hands-on problem solving classroom type projects to manage/configure/monitor systems and implement security policies reflecting the decisions that students make in simulation scenarios. Custom simulation scenarios are developed, which address objectives relevant to the STEM curriculum. Tutorials may be published online to augment classroom lessons learned and therefore enhance inquiry-based learning. Gaming and simulations may be used to capture and maintain student attention and enhanced effectiveness in cognitive development. The hands-on virtual classroom model may also be used to offer industry recognized certifications, such as the CompTIA Net +, A +, and Security +.

The education system described herein includes various logical stages and processes that are part of the field of cyber security and may be independent of one another. The education system enables students in the field of cyber security to receive collaborative benefit from effective training given to other students in the domain of cyber security. Integrated learning structures that are accessible to multiple organizations simultaneously can provide uniformity of learning and synergy. The structures can be tailored to unique learning needs of a variety of organizations.

Distance learning and computer-based training methods can be used to help meet demands for more effective and efficient training. Communication tools, which include the Internet, provide effective mediums that can be used for distance learning purposes. Internet connections provide access to a plethora of data as well as various communications means that can be conducted via computer systems and networks. The use of these tools allows students to participate in learning activities, for example, viewing and listening to pre-recorded materials and real-time presentations. Written learning materials, as well as testing materials, can be delivered on-line as well.

Exemplary embodiments include learning modules, which utilize publicly available industry proven content, integrated with knowledge and practical experience from certified professionals, i.e., experts, in the domain of cyber security. This combined with video, simulations, animation and gaming creates a unique learning experience for the student and is designed to capture and maintain the student's attention.

The STEM based cyber security education system can provide a full range of fundamental knowledge and learning solutions designed to improve student knowledge and skills in the cyber security domain. In exemplary embodiments, the STEM based cyber security education system provides students with essentials of computer networking, operating systems, firewalls, elements of security levels, network management, and risk and exposure factors. The STEM based cyber security education system can also include, for example, modules covering the following competencies outside of basic computer literacy:

Network fundamentals;
Avenues of attack;
Basic security terminology;
Physical security (access controls and physical barriers;
Security baselines (passwords);
The roles of people in security;
The risks of using public computers;
Cyber ethics;
Cyber law;
Network topology;
Network protocols;
Wireless networking;
Base lining and hardening;
Forensics;
Network hardware;
Network workstation client configuration;
TCP/IP stack (OSI model);
Social engineering and securing social spaces;
World Wide Web; and
Password cracking.

The STEM based cyber security education system utilizes an educational pedagogy that includes module-based differentiated instruction which allows students to progress at their level of competency or knowledge base. A blended learning/e-learning approach facilitated by certified professional coaches creates an enhanced interactive learning experience using STEM-infused content. Interactive simulation in training exercises can be used in combination with video tutorials, podcasts, Adobe FLASH-based and interactive content. The STEM based cyber security education system may also include a cyber-security lab environment that emulates a command control center to provide visual and auditory appeal/engagement.

Concurrently, embodiments provide a learning system and related methods that reduces training costs. In particular, overall cost may be reduced through the utilization of web-based delivery of live and/or recorded lectures to reduce the need for repetitive seminars. Additionally, the STEM-based cyber security education system and related methods provide a mechanism for personal instructor feedback in a distance-learning environment. This is provided through a coordinated means to talk with the instructors, and coaches remotely.

The STEM-based cyber security education system and related methods can also be utilized for team projects and personal interaction. Aspects include the use of audio/video conferencing and other distance learning techniques when geographical considerations preclude personal group interactions.

The STEM-based cyber security education system and related methods provide an opportunity for community exchange of ideas among peers. Included is the use of a blended learning approach that may combine on-line simulations, self-study, audio/video conference calls, team oriented assignments, discussion threads, virtual lectures and traditional seminars.

The effectiveness of the STEM-based cyber security education system is based on a combination of industry approved content, technology and methodology. The STEM-based cyber security education system and related methods provide everything in one place with regard to STEM/cyber security training. The benefits of training are multiplied by providing a comprehensive learning system that makes the resources available to all participants of the STEM-based cyber security education system.

FIG. 1 illustrates an exemplary networking arrangement 5 for implementing a STEM-based cyber security education system 100. The exemplary networking arrangement 5 may be an Internet environment and/or other network environments known in the art, such as a wide area network and/or a local area network. A STEM-based cyber security education system interface 200 provides interface logic for the STEM-based cyber security education system 100. In the embodiment of FIG. 1, the STEM-based cyber security education system interface 200 is contained on an educational content server 300, e.g., a Web server that is connected to other computers by networking infrastructure 400 (e.g., the Internet). The STEM-based cyber security education system interface 200 is structured to receive requests from end user computers, such as end user computers 30a, 30b, 31a, 31b, 32a, and/or 32b, for computer-based educational tools and to monitor use of computer-based traditional and distance learning educational tools. The word "computer" as used herein includes any networked/web-enabled device, such as computer workstations, PDAs, laptop computers, etc. An end user may access the STEM-based cyber security education system interface 200 through the networking infrastructure 400 in a classroom and/or lab environment or indirectly through an end user computer local server.

STEM-based cyber security educational content 20, which can be organized in modules, may be stored in a content database 10 for access according to licensing information provided by each end user. The content database 10 is coupled to the educational content server 300. Upon a request from the end user or School Systems Instructor/Coach's computer, specific educational content 20 is retrieved from the content database 10 and delivered via the networking infrastructure 400 directly through servers 301a and/or 301b to the end user's computer, such as end user computer 30a, 30b, 31a, or 31b. Servers can be functionally partitioned, such as serving non-video content through server 301a and video through server 301b, where server 301b may support two-way video streams. End user computers, such as end user computers 32a and 32b, may alternatively interface directly with the networking infrastructure 400.

The content database 10 can include an index of the content available through the educational modules; a content record coupled to the content, where each of the content records indicates one or more logical stages linked to the content; a company, and/or school system registration module that allows the company and/or school system to create a profile for the content used by students; and a STEM/cyber security learning application interface providing access to the content training, videos, games, and simulation modules as well as chat rooms and collaborative forums.

In embodiments, the STEM-based cyber security education system interface 200 supports hosting and delivery of computer-based training modules, recorded presentations, on-demand and live Web casts, on-line discussion sessions, discussion forums, and various other media playback formats. Files can be made available by a variety of technologies, such as FLASH, JAVA, audio and video playback software, and Web browsers.

Access to the STEM-based cyber security education system 100 may be permitted via single user licensing, tuition, and/or school, school system or organization-wide licensing agreements. Fees may be based on a per user license/tuition.

Figure 2:
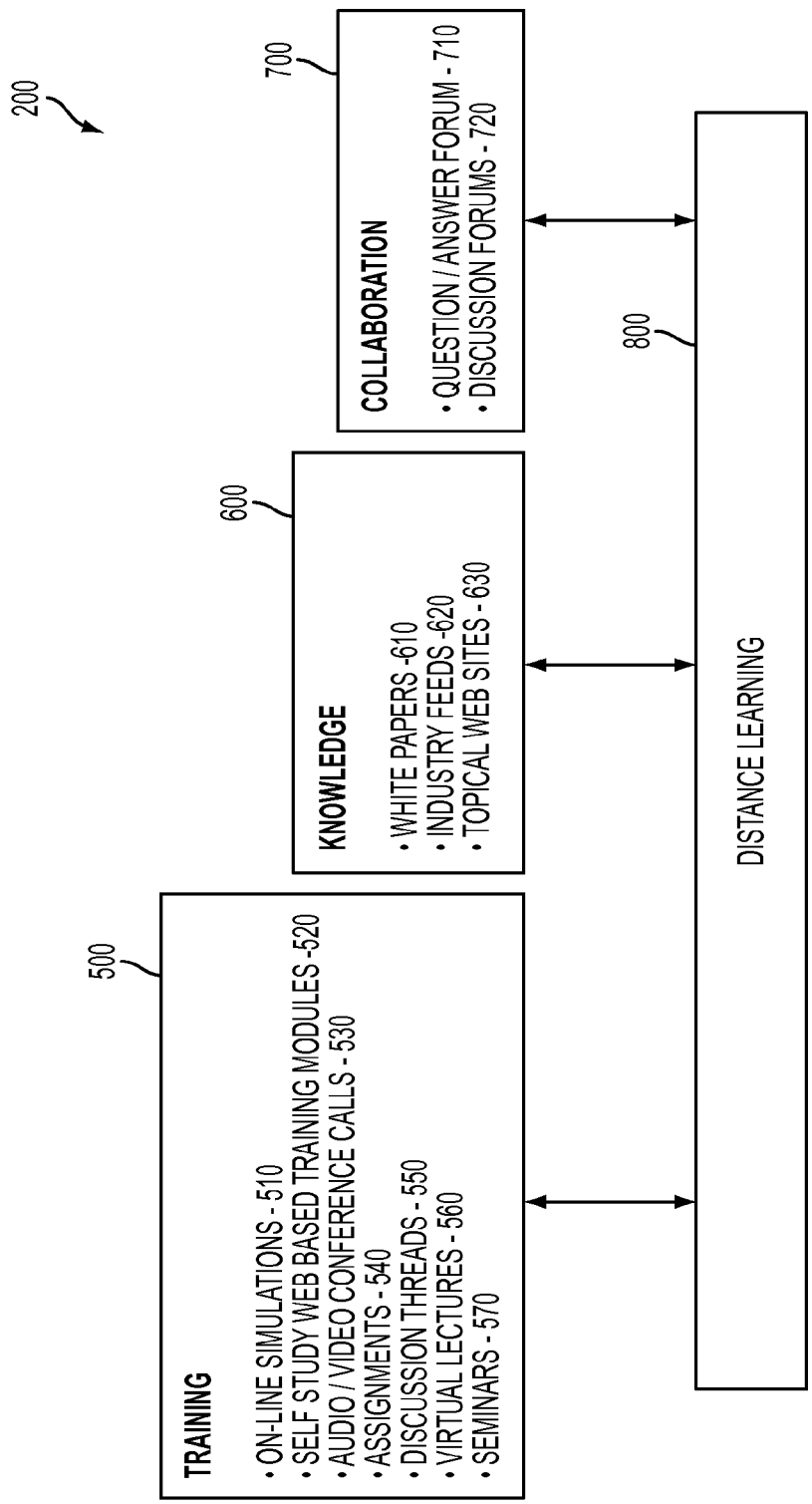
FIG. 2 identifies examples of operational components of a STEM-based cyber security education system.

FIG. 2 identifies examples of operational components of the STEM-based cyber security education system 100 of FIG. 1 available through the STEM-based cyber security education system interface 200. The example of FIG. 2 includes four interrelated components: a training component 500, a knowledge component 600, a collaboration component 700, and a distance-learning component 800. The combination of components provides computer-based educational tools, traditional learning tools, and distance learning tools all relating to the delivery of STEM/cyber security knowledge exchange/learning that enhances the learning experience of students in a cost effective manner. These computer-based learning tools, for example, include learning assets delivered from the STEM-based cyber security education system interface 200 to the end user computers 30a-32-b of FIG. 1. Traditional learning education tools, for instance, include learning assets provided through personal or classroom instruction and team oriented projects. Distance learning educational tools, for example, include pre-recorded audio/video media, telephone conferences etc.

The STEM-based cyber security education system interface 200 may include real time measurements for student outcomes for each logical training/content component. Access and reports for individual users and/or groups of users can be made available.

The training component 500 blends a number of training methodologies, including the use of on-line simulations (for individual and groups of users) 510, self-study web based training modules 520, audio/video conference calls 530, individual and/or team assignments 540, discussion threads 550, virtual lectures 560, and traditional seminars 570.

The on-line simulations 510 provide the users with relevant learning scenarios that are representative of experiences within STEM/cyber security environments. These simulations can be tailored for groups and/or individuals and may require, for example, discussions, research, meetings or interviews that are conducted off-line. The self-study web-based training modules 520 are made up of computer-based training self-study that allows the user to work through a selected training area at the user's own pace and schedule. The on-line simulations 510 and the self-study web-based training modules 520 can employ a variety of learning enhancement features to adapt the content to the user based on progress.

A hierarchical temporal memory (HTM) model can be used to learn what works and does not work over time for each student. An HTM model is a bio-inspired machine learning technique that models some of the structural and algorithmic properties of the neocortex based on memory-prediction theory of brain function. An HTM model utilizes a unique combination of Bayesian networks, spatial and temporal clustering algorithms, while using a tree-shaped hierarchy of nodes to iteratively learn and select applicable patterns based on student responses. Beyond monitoring inputs, such as time until response and accuracy of response to questions or in simulated scenarios, other input sources can be used to monitor students and enhance learning of patterns.

In an embodiment, the on-line simulations 510 and/or the self-study web-based training modules 520 can use an electroencephalography (EEG) headset (e.g., EEG headset 1120 of FIG. 3) that enables accurate detection of "error related negativity" for adapting the content. Error related negativity is a form of an event related potential that can be triggered in the brain when a user makes a mistake and is aware of it, resulting in a brain pattern that is detectible by the EEG headset. In other words, when a student makes the wrong choice and realizes it right after the selection, the STEM-based cyber security education system 100 is able to understand this and may adapt the level of difficulty of material presented to the student or take other actions. Additionally, by using video input captured from a camera (e.g., camera 1110 of FIG. 3), the STEM-based cyber security education system 100 may also analyze and determine the "aha" moment of the student upon understanding a concept. Monitoring of student pupil dilation and eye movement can be used in combination, for example, by monitoring when the student's eyes are focused on material to be learned and dilate within a predetermined period of time. Further, camera-based analysis combined with EEG signals can provide an enhanced learning feedback mechanism that ensures students are actually making progress. Thus, the STEM-based cyber security education system 100 can provide module-based differentiated instruction adjusted based on student progress for module completion and reaction to content delivered.

Conference calls 530, both audio and video, provide for interactive discussions between peers and with instructors/coaches. Conference calls can be very valuable when used for kick-off sessions for group projects and for providing feedback from the instructor/coach.

Assignments 540 provide a wide range of learning benefits. The use of distance learning component tools allow for more flexibility throughout the learning process.

Discussion threads 550 provide for collaboration among the users in answering questions or working through scenarios that have been developed by the instructor/coach to enhance the learning experience. This provides a mechanism for communication and sharing of ideas and potential solutions between the users and/or teams.

Virtual lectures 560 provide for traditional instruction without the cost of travel or classroom restrictions. Lectures can be conducted, for example, via live web-casts or recorded for the user to view at a later time. Understanding limits of the ability to simulate live interactions, traditional seminars 570 are included as instructional tools where needed.

The knowledge component 600 includes access to white papers 610, industry feeds 620, topical web sites 630, and content uploaded by users that are relevant to the cyber security domain. These tools are available to the users on demand. The knowledge component 600 can be incorporated into part of specific training exercises or as an on-going learning experience.

Collaboration component 700 provides a forum for discussions with the instructors/expert coaches within the domain of cyber security and STEM education that help to build collaboration and a sense of community among the users. For example, question/answer forum 710 is used to allow the experts to communicate with the users and to provide feedback to questions and problems that the users are facing as it pertains to the training materials and their applications. The question/answer forum 710 also provides a way for the experts to share practical experience from their time working in the cyber security domain. Additionally, discussion forums 720 are used to provide a scheduled environment to discuss issues with the experts and with other users. Discussion forums 720 may be conducted on-line in real time or in a traditional live setting.

Distance learning component 800 is coupled to and provides an interactive interface for the training component 500, the knowledge component 600, and the collaboration component 700. The distance learning component 800 includes capabilities such as live web casts, video conferencing, and forum management.

Figure 3:
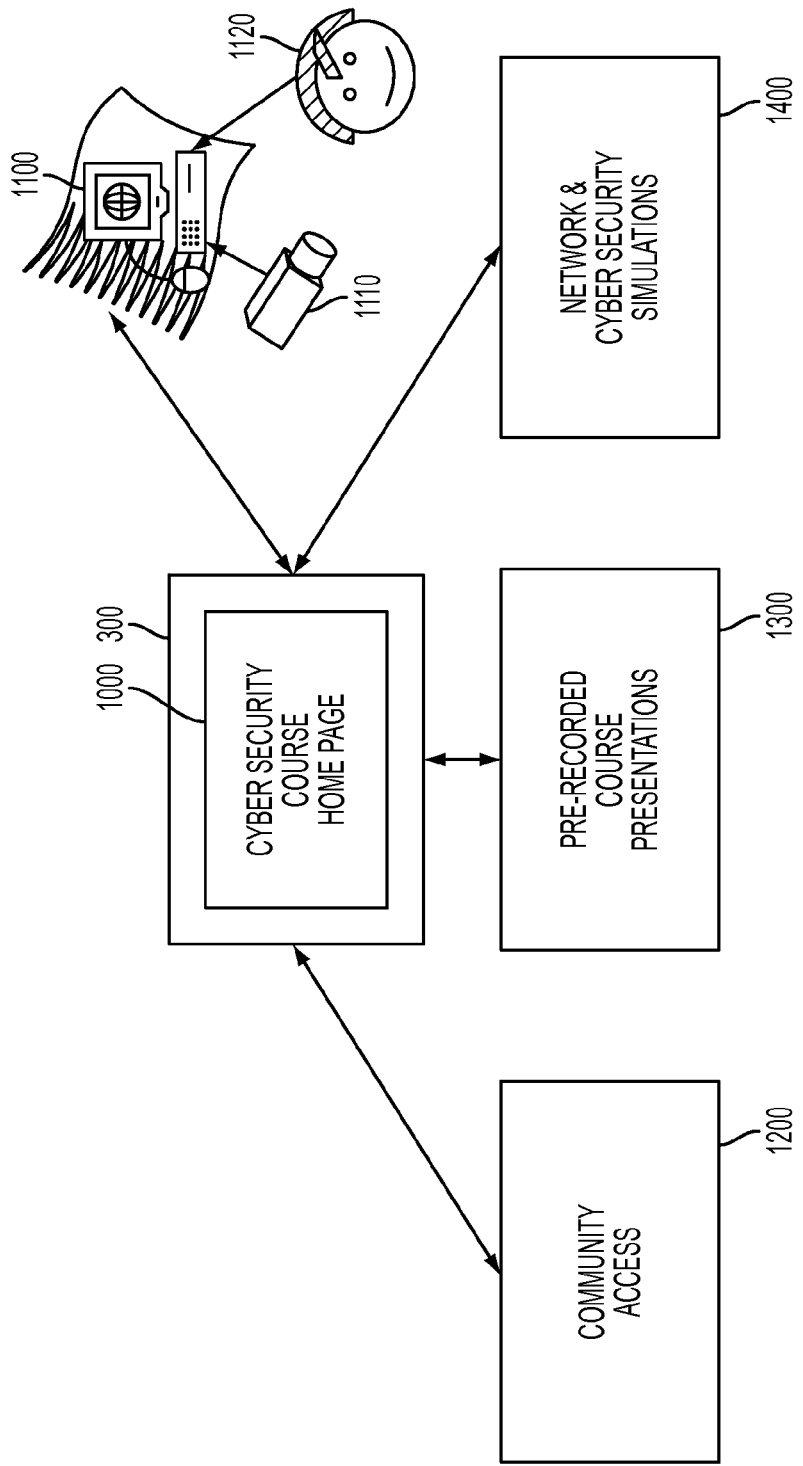
FIG. 3 illustrates an example implementation of a STEM-based cyber security education system.

FIG. 3 illustrates an example implementation of the STEM-based cyber security education system 100 of FIG. 1. The STEM-based cyber security education system 100 may be implemented as an Internet model or within other mediums such as local area networks. The STEM-based cyber security education system interface 200 of FIGS. 1 and 2 may be accessed through a cyber-security course home page 1000 served by the educational content server 300. A user of a user end computer 1100, such as user end computers 30*a*-32*b* of FIG. 1, proceeds through an initial login process that will identify the appropriate location, for example, the Science Center of Pinellas County, Inc. or School System, etc. The user end computer 1100 can include computer system interfaces such as a monitor, keyboard, mouse, and audio output in addition to a camera 1110 and an EEG headset 1120. The camera 1110 can be used to support two-way interactive video-based discussions as well as to enhance feedback-based learning for the on-line simulations 510 and/or the self-study web-based training modules 520 of FIG. 2. Alternatively, the STEM-based cyber security education system 100 of FIG. 1 may, in a limited capacity act, as a stand-alone learning system collecting course completion, and completion of traditional and distance learning activities.

Once logged into the STEM-based cyber security education system 100, the user can access different segments such as community access 1200, pre-recorded course presentations 1300, and network and cyber security simulations 1400. The community access 1200 can include discussion forums and questions posed to one or more experts. The pre-recorded course presentations 1300 can provide users with Adobe FLASH and interactive content, video tutorials, podcasts, slide presentations, and/or transcripts. The network and cyber security simulations 1400 may provide access to third-party hosted sites and downloaded materials.

Figure 4:
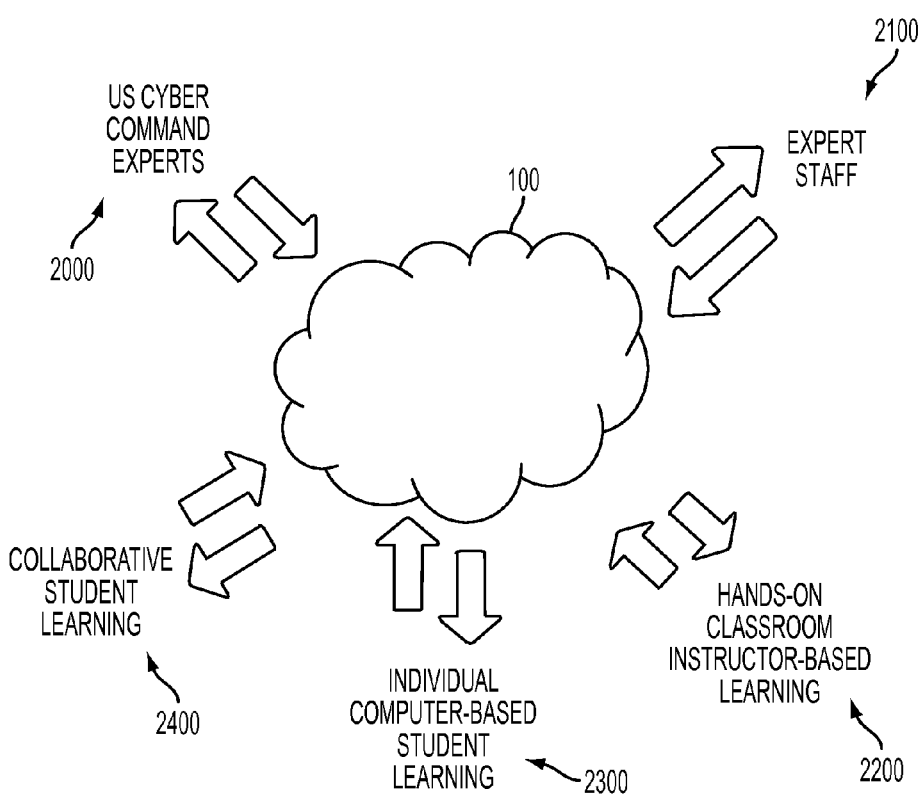
FIG. 4 is an example of a blended learning approach used in a particular course.

FIG. 4 is an example of a blended learning approach used in a particular course. The example course is accessed by logging into the cyber-security course home page 1000 of FIG. 3 through the STEM-based cyber security education system interface 200 of FIGS. 1 and 2 of the STEM-based cyber security education system 100 of FIGS. 1 and 4. Access to the course schedule and materials is provided on the cyber-security course home page 1000. Through the cyber-security course home page 1000, users access a series of scheduled and unscheduled discussions, presentations in various formats and reading materials. Group projects are also accessed and tracked on the cyber-security course home page 1000. Blended learning supported by the STEM-based cyber security education system 100 includes various interactions with US cyber command experts 2000, expert staff 2100, hands-on classroom instructor-based learning 2200, individual computer-based student learning 2300, and collaborative student learning 2400. The US cyber command experts 2000 and expert staff 2100 are examples of experts in the cyber security domain that establish an interactive session with users of end user computers 30*a*-32*b*, 1100 through the STEM-based cyber security education system 100 to provide synchronous delivery of STEM-based cyber security materials. The STEM-based cyber security materials discussed and provided by the experts may be provided in addition to the STEM-based cyber security educational content 20 of FIG. 1. Interactions with the US cyber command experts 2000, expert staff 2100, and hands-on classroom instructor-based learning 2200 enables synchronous and interactive discussions with experts that extend beyond a single course instructor. Therefore, the course includes a combination of scheduled (synchronous) and unscheduled (asynchronous) elements as further illustrated in FIG. 5.

Figure 5:
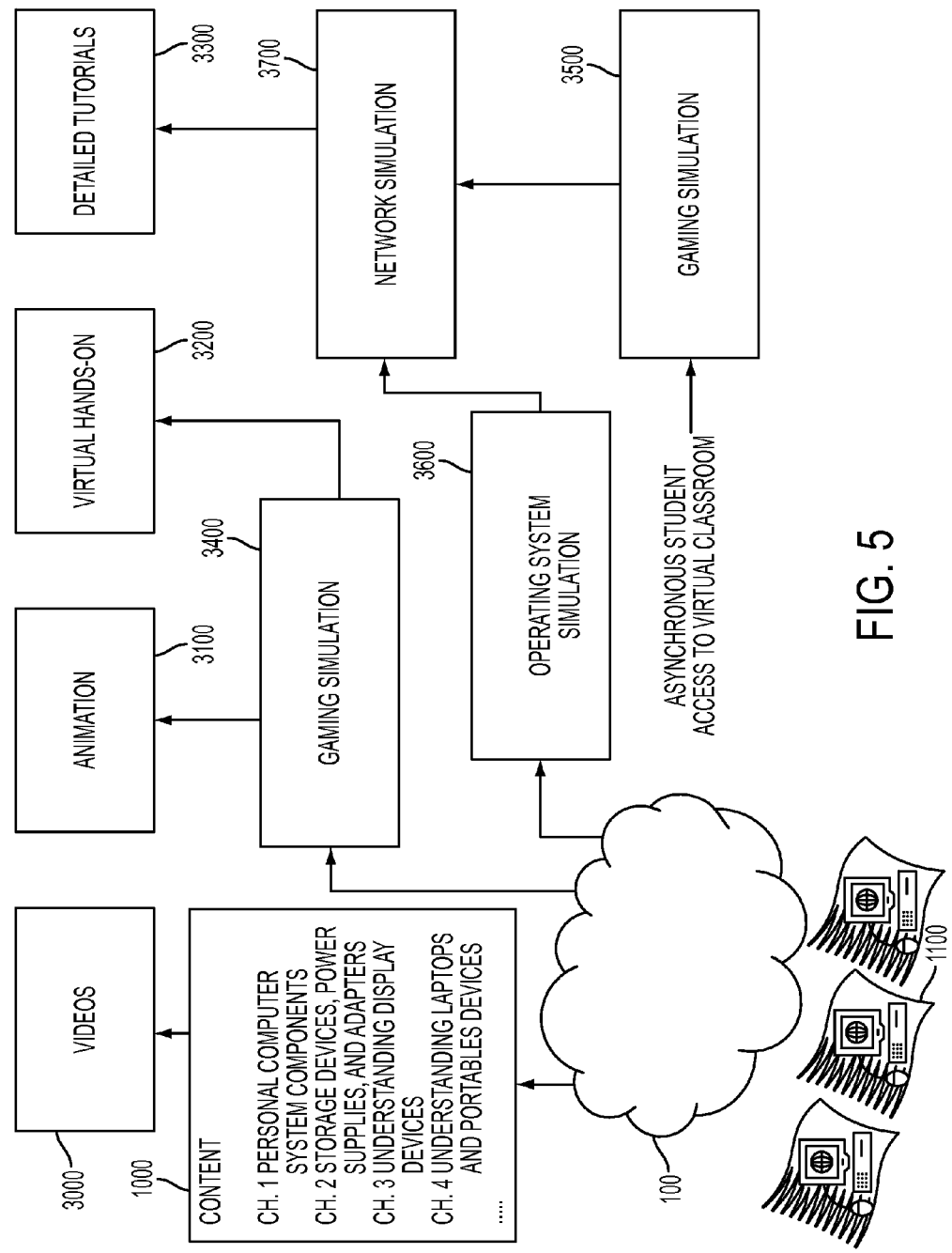
FIG. 5 depicts a combination of synchronous and asynchronous modules of a particular course utilizing a blended learning approach according to embodiments.

FIG. 5 depicts a combination of synchronous and asynchronous modules of a particular course utilizing a blended learning approach for student access options to a virtual classroom. Students can access content on a cyber-security course home page 1000 through the STEM-based cyber security education system 100 to interface user end computers 1100, such as user end computers 30*a*-32*b* of FIG. 1, with a number of modules. The modules can support synchronous and asynchronous interactions and may include: a video module 3000, animation module 3100, virtual hands-on module 3200, detailed tutorial module 3300, various gaming simulation modules 3400 and 3500, operating system simulation module 3600, and network simulation module 3700. The various gaming simulation modules 3400 and 3500 may specifically include cyber security content for real life simulations of cyber-attacks, counter attacks, and security protection techniques.

An example course begins with a live portion (or live web cast or live audio conference call). Individual and class activities may be setup for simulations, or hands-on labs with the entire class.

The STEM-based cyber security education system 100 allows members of the class to collaborate or work individually on each assignment. The use of distance learning tools reduces the costs and travel commitments that might otherwise prevent or limit participation in accessing this level of STEM/cyber security training and certification. The course format allows for larger class sizes than typical live seminar formats support.

Figure 6:
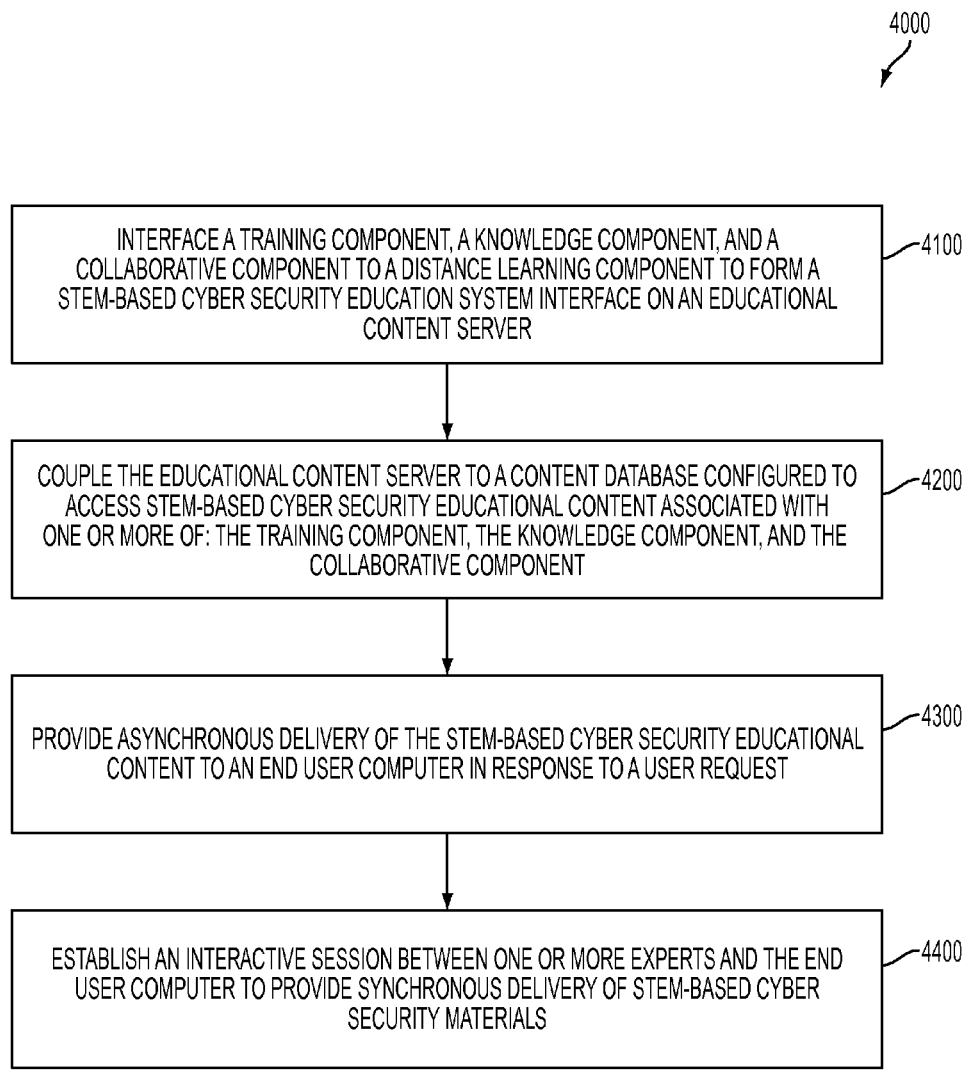
FIG. 6 depicts a process for providing a STEM-based cyber security education system according to embodiments.

FIG. 6 depicts an example of a process 4000 for providing the STEM-based cyber security education system 100 of FIGS. 1-5. Accordingly, the process 4000 is described in reference to FIGS. 1-6. At block 4100, the training component 500, the knowledge component 600, and the collaborative component 700 are interfaced to the distance learning component 800 to form the STEM-based cyber security education system interface 200 on the educational content server 300. At block 4200, the educational content server 300 is coupled to the content database 10 which is configured to access STEM-based cyber security educational content 20 associated with one or more of: the training component 500, the knowledge component 600, and the collaborative component 700. At block 4300, asynchronous delivery of the STEM-based cyber security educational content 20 is provided to an end user computer 30*a*-32*b*, 1100 in response to a user request. At block 4400, an interactive session is established between one or more experts 2000, 2100 and the end user computer 30*a*-32*b*, 1100 to provide synchronous delivery of STEM-based cyber security materials.

As will be appreciated from above, the exemplary embodiments provide a learning application for providing educational content related to STEM/cyber security, where STEM/cyber security includes a plurality of logical stages comprising sciences, technologies, engineering, and mathematics and computer architecture. The STEM-based cyber security education system includes a network, an educational content server, a plurality of end-user computers and communication means connecting the educational content server to the plurality of end user computers. The educational content server includes a STEM-based cyber security education system interface including a training component, a knowledge component, a collaboration component, and a distance learning component, where educational content provides STEM content classified as either individual specific or group specific with at least one of the logical stages.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for providing a science, technology, engineering and mathematics (STEM) based cyber security education system, the method comprising:
   interfacing a training component, a knowledge component, and a collaborative component to a distance learning component to form a STEM-based cyber security education system interface on an educational content server;
   coupling the educational content server to a content database configured to access STEM-based cyber security educational content associated with one or more of: the training component, the knowledge component, and the collaborative component;
   providing asynchronous delivery of the STEM-based cyber security educational content from the content database through the educational content server and a networking infrastructure to an end user computer in response to a user request;
   establishing an interactive session through the educational content server and the networking infrastructure between one or more experts and the end user computer to provide synchronous delivery of STEM-based cyber security materials; detecting error-related negativity by the educational content server based on input from an electroencephalography headset coupled to the end user computer; and
   providing, by the educational content server, module-based differentiated instruction adjusted based on student progress according to a hierarchical temporal memory model that identifies patterns based on student responses in combination with video input from a camera coupled to the end user computer that monitors student eye response reactions to content delivered and the error-related negativity detected from the electroencephalography headset.

2. The method of claim 1, wherein the training component comprises one or more of: on-line simulations, self-study web based training modules, audio/video conference calls, assignments, discussion threads, virtual lectures, and traditional seminars.

3. The method of claim 1, wherein the knowledge component comprises one or more of: access to white papers, industry feeds, topical web sites, and content uploaded by users.

4. The method of claim 1, wherein the collaborative component comprises one or more of: a question/answer forum and a discussion forum.

5. The method of claim 1, wherein the user request is received at a cyber security course home page of the STEM-based cyber security education system interface, the cyber security course home page providing secure access to a plurality of segments including: community access, pre-recorded course presentations, and network and cyber security simulations.

6. The method of claim , wherein the community access comprises one or more of: discussion forums and questions posed to the one or more experts; the pre-recorded course presentations comprise one or more of: interactive content, video tutorials, podcasts, slides, and transcripts; and the network and cyber security simulations comprise one or more of: third-party hosted sites and downloaded materials.

7. The method of claim 5, further comprising:
   providing access to the STEM-based cyber security educational content through the cyber security course home page; and
   based on a user selection, interfacing the user end computer with one or more of: a video module, an animation module, a virtual hands-on module, a detailed tutorial module, a gaming simulation module, an operating system simulation module, and a network simulation module.

8. The method of claim 1, further comprising: interfacing a plurality of end user computers with the STEM-based cyber security education system interface to provide asynchronous delivery of the STEM-based cyber security educational content to the plurality of end user computers and include the plurality of end user computers in the interactive session.

9. The method of claim 1, wherein the one or more experts include one or more of: US cyber command experts and expert staff in a cyber security domain.

10. A system for providing a science, technology, engineering and mathematics (STEM) based cyber security education, the system comprising:
    a content database configured to access STEM-based cyber security educational content; and
    an educational content server coupled to a networking infrastructure and the content database, the educational content server comprising: a STEM-based cyber security education system interface comprising a training component, a knowledge component, and a collaborative component interfaced to a distance learning component, the STEM-based cyber security education system interface configured to provide asynchronous delivery of the STEM-based cyber security educational content from the content database through the networking infrastructure to an end user computer in response to a user request, and the STEM-based cyber security education system interface is further configured to establish an interactive session between one or more experts and the end user computer to provide synchronous delivery of STEM-based cyber security materials, detect error-related negativity based on input from an electroencephalography headset coupled to the end user computer, and provide module-based differentiated instruction adjusted based on student progress according to a hierarchical temporal memory model that identifies patterns based on student responses in combination with video input from a camera that monitors student eye response reactions to content delivered and the error-related negativity detected from the electroencephalography headset.

11. The system of claim 10, wherein the training component comprises one or more of: on-line simulations, self-study web based training modules, audio/video conference calls, assignments, discussion threads, virtual lectures, and traditional seminars.

12. The system of claim 10, wherein the knowledge component comprises one or more of: access to white papers, industry feeds, topical web sites, and content uploaded by users.

13. The system of claim 10, wherein the collaborative component comprises one or more of: a question/answer forum and a discussion forum.

14. The system of claim 10, wherein the user request is received at a cyber security course home page of the STEM-based cyber security education system interface, the cyber security course home page providing secure access to a plurality of segments including: community access, pre-recorded course presentations, and network and cyber security simulations.

15. The system of claim 14, wherein the community access comprises one or more of: discussion forums and questions posed to the one or more experts; the pre-recorded course presentations comprise one or more of: interactive content, video tutorials, podcasts, slides, and transcripts; and the network and cyber security simulations comprise one or more of: third-party hosted sites and downloaded materials.

16. The system of claim 14, wherein the STEM-based cyber security education system interface provides access to the STEM-based cyber security educational content through the cyber security course home page, and based on a user selection, the user end computer is interfaced with one or more of: a video module, an animation module, a virtual hands-on module, a detailed tutorial module, a gaming simulation module, an operating system simulation module, and a network simulation module.

17. The system of claim 10, wherein a plurality of end user computers are interfaced with the STEM-based cyber security education system interface to provide asynchronous delivery of the STEM-based cyber security educational content to the plurality of end user computers and include the plurality of end user computers in the interactive session.

18. The system of claim 10, wherein the one or more experts include one or more of: US cyber command experts and expert staff in a cyber security domain.

* * * * *